March 31, 1970     A. T. GALBATO     3,503,820
METHOD OF MANUFACTURING CONICAL LAMINATE ELEMENTS
Filed Aug. 17, 1967
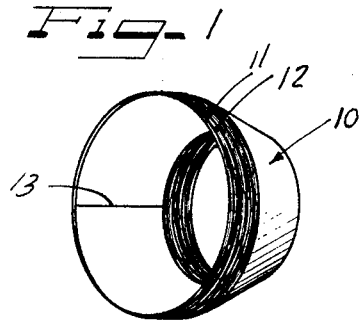
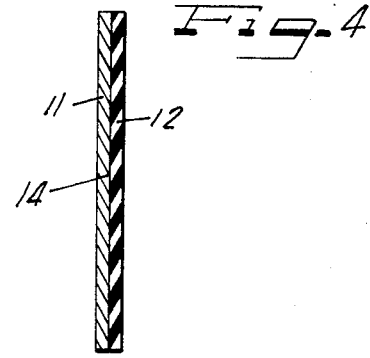
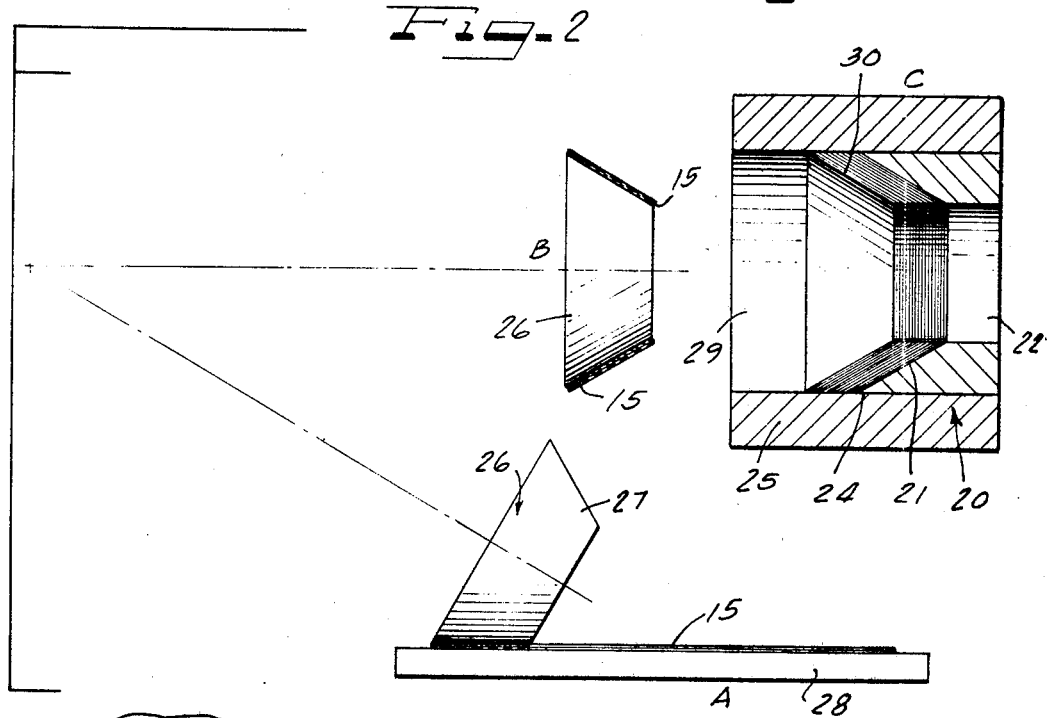
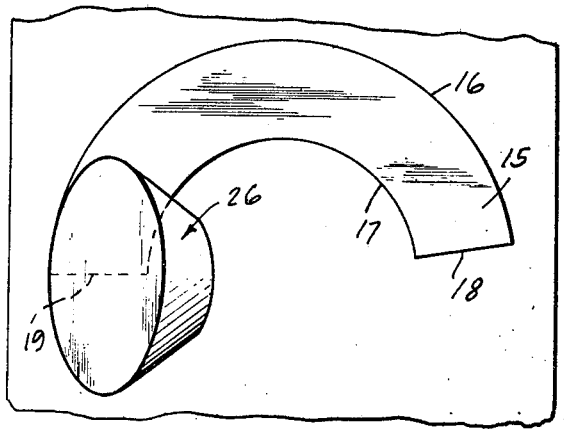
INVENTOR.
ANTHONY T. GALBATO
BY Hill, Sherman, Meroni, Gross & Simpson
ATTORNEYS United States Patent Office 3,503,820
Patented Mar. 31, 1970

3,503,820
METHOD OF MANUFACTURING CONICAL LAMINATE ELEMENTS
Anthony T. Galbato, Jamestown, N.Y., assignor to TRW, Inc., Cleveland, Ohio, a corporation of Ohio
Filed Aug. 17, 1967, Ser. No. 661,400
Int. Cl. B65h *81/00;* F16c *25/06*
U.S. Cl. 156—189                                         5 Claims

ABSTRACT OF THE DISCLOSURE

A method of manufacturing hollow-frusto-conical laminated bearings including coating an elastomer to a planar sheet of bearing material, blanking the coated sheet into a number of curved shims, rolling each shim around a mandrel loader and retaining it thereon by an attractive force, inserting the loader into a holder having a conical end wall and cylindrical side walls, releasing the rolled shim from the loader, repeating the process with a desired number of additional shims, and molding the resultant stack to bond the shims together.

BACKGROUND OF THE INVENTION

Field of the invention

This invention relates to laminated bearings and more particularly to a method of manufacturing conically shaped laminated bearings.

Description of the prior art

Laminated bearings consisting of alternated bonded-together layers of elastomer and non-elastomer bearing material are known to the art. The patent to Hinks, No. 2,900,182, teaches that such laminated bearings are substantially incompressible while readily yielding to torsional forces. Because of the particular advantages inherent in such laminated bearings, they have been found to be useful in a wide variety of situations.

Many of the applications of laminated bearings require that the bearing stack be conical, such as is shown in FIGURE 2 of the aforementioned Hinks Patent No. 2,900,182. Various methods have been devised to manufacture such bearings, including hand assembly of individual elastomer coated conical shaped bearing material layers and continuous strip windings of tapered elastomer coated bearing material layers, as for example in the patent to Hinks, No. 3,071,422. Such prior art methods, however, are expensive, time consuming and in some instances produce inferior bearings.

SUMMARY OF THE INVENTION

The present invention overcomes the deficiencies in the prior art by providing an automatic method readily adaptable to mechanization for producing conical laminated bearing stacks.

Because such conical bearings are preferably made as a stack of alternate layers of elastomer and non-elastomer bearing material, the invention provides a method for producing such stacks in any desired height. The method consists of coating one face of a planar strip of non-elastomeric bearing material with elastomer to a desired thickness, of blanking curved shims from the coated strip, which shims have a curvature such as then when rolled end-to-end, they will be frusto-conical, rolling the individual shims end-to-end on the outside surface of a frusto-conical loading device, retaining them on the device for a period of time by application of an attractive force, moving the loading device with the coated rolled shim thereon into position relative to a holder which has an interior configuration adapted to receive a conical laminated bearing stack, depositing the rolled shim from the loading device into the holder in stacked relation with previously rolled shims and thereafter, when a sufficient number of shims have been received in the holder to produce a laminated bearing of the desired number of layers, molding the coated shims into a bearing.

It is then an object of this invention to provide a method of assembling conical laminated bearings which can be adapted to mechanization.

It is a further object of this invention to provide a method of producing conical laminated bearings from planar elastomer coated bearing material stock which method can produce conical bearings of any desired number of layers and which is adaptable to mechanization.

It is a further and more specific object of this invention to provide a method of assembling laminated conical bearings from planar bearing material strips coated with elastomer which uses an attractive force to temporarily adhere shims cut from the planar sheet onto the surface of a conical loader which will stack the shims into a conical stack in a holder, which method may be readily adapted to mechanization.

BRIEF DESCRIPTION OF THE DRAWINGS

FIGURE 1 is a perspective view of a conical laminated bearing;

FIGURE 2 is a diagrammatic view of the operation of the loader of this invention;

FIGURE 3 is a top diagrammatic view of the loader of this invention in position preparatory to loading; and FIGURE 4 is an enlarged cross sectional view of a coated strip of bearing material used in the method of this invention.

DESCRIPTION OF THE PREFERRED METHOD AND MEANS

FIGURE 1 illustrates a conical laminated bearing 10 as produced by the method of this invention. The bearing 10 is composed of a stack of alternate bonded together layers of non-elastomer 11 and elastomer 12, as more fully explained in the aforementioned patent to Hinks, No. 2,900,182. Each layer 11 and 12 is originally flat. The layers are bent into the conical shape prior to final molding of the bearing 10. As each layer is formed into the conical shape, its ends meet in a split 13. The split 13 of each non-elastomer layer 11 is offset from the split 13 of each adjacent non-elastomer layer in the assembly of the bearing stack so that the final bearing 10 is not split.

As best shown in FIGURE 4, the method of producing conical laminated bearings begins with a strip of thin planar non-elastomeric bearing material 11. One face 14 of the strip of non-elastomeric bearing material 11 is coated with elastomer 12. The non-elastomeric bearing material 11 may be metal, plastic, or the like non-stretchable material. The elastomer 12 may be natural rubber, synthetic rubber, or an elastomeric plastic or the like material. The coating of the face 14 of the non-elastomeric material 11 may be by any process which produces a coating of controllable thickness. The elastomeric layer 12 should have a thickness after coating of no more than 120% of the final elastomeric layer thickness after molding of the conical bearing 10. This layer thickness may be determined by application of the principles described in the aforementioned Hinks Patent No. 2,900,182.

As best illustrated in FIGURE 3, after coating the elastomer layer 12 to the non-elastomer layer 11, curved shims 15 are blanked from the coated strip. The shims 15 may be blanked by cutting, stamping or the like methods. The shims 15 are curved, with an outside diameter 16 and an inside diameter 17 struck from radii of different lengths, but having the same center point. The ends 18 and 19 of the shims 15 are radial to the same center point. In this manner, when the shims 15 are rolled so that the end 18 mates with the end 19, the rolled shim 15 assumes a hollow conical shape.

As shown in FIGURE 2, when rolled into the frusto-conical shape, the individual shims 15 are inserted into and stacked in a holder 20. The interior of the holder 20 is shaped so as to receive the stack of shims. The holder 20 has a frusto-conically shaped back wall 21 which is frusto-conically angled at the same angle which the individual shims will have when rolled. The frusto-conical back wall 21 mates with a cylindrical wall 25. The frusto-conical back wall 21 may be reciprocably received in the cylindrical wall 25 so that the bearing stack when assembled can be pushed out of the cylindrical wall 25 for removal from the holder 20.

A frusto-conical mandrel loader 26 is used to roll the individual shims 15 into the frusto-conical shape and to assemble them in the holder 20. The loader 26 has an outside surface 27 which is conically tapered to the same degree as the individual shims 15 when rolled. Therefore, when the individual shims 15 are rolled around the outside surface 27 of the loader 26, the ends 18 and 19 will meet at the split 13. A conveyor belt 28 or the like, is used to bring the shims 15 in their planar state to the operating position of the loader 26. The outside surface 27 of the loader 26 is then brought into contact with the non-elastomeric layer 11 of the shim 15. The loader 26 is then rotated around its axis to roll the shim 15 onto the outside surface 27 of the loader 26. In order to facilitate rolling of the shim 15 onto the outside surface 27 of the loader 26, the conveyor belt 28 may operate as a turntable allowing the shim to wind up onto the revolving loader 26.

In order to temporarily hold the shim 15 onto the outside surface 27 of the loader 26, an attractive force is created to draw the shim tightly against the surface 27 of the loader 26. In those instances where the non-elastomeric material of the layers 11 is a ferrous or other magnetic material, the loader 26 may be an electro-magnet energized to selectively attract and hold the shim 15 on the surface 27. In those instances where the non-elastomeric material of the layers 11 is non-magnetic, the attractive force may be a vacuum. In the instances where a vacuum is used, the surface 27 of the loader 26 may be perforated or porous and the loader 26 may be hollow and attached to a vacuum pump or the like.

The coated shim 15 is rolled onto the surface 27 of the loader 26 at the position A, indicated in FIGURE 2. After the shim 15 has been rolled onto the surface 27 of the loader 26, the loader 26 is removed to position B aligned with the opening 29 of the holder 20. Thereafter, the loader 26 with the shim 15 therearound, is advanced into the opening 29 of the holder 20, which is indicated at position C of FIGURE 2. The loader 26 is advanced into the opening 29 of the mold 20 to a depth sufficient to bring the shim 15 into contact with the frusto-conically tapered back wall 21 or in successive cycles with the shims already received in the holder 20. After contact between the shim 15 rolled around the surface 27 of the loader 26 and the back wall 21 or with previous shims 30 already received in the holder 20, the attractive force holding the shim 15 on the loader 26 is removed either by de-energizing the magnetic attraction or by removal of the vacuum. The loader 26 is then retracted from the holder 20, leaving the shim 15 in place in the holder 20. After retraction of the loader 26 from the holder 20, it is returned to the position A for commencement of another cycle.

In order to assure that the shim 15 will be deposited in the holder 20 when the loader 26 is removed therefrom, an axial pressure may be provided when the shim 15 is brought into contact with the shims 30 already in the holder 20. The axial pressure may be provided by the loader 26, or in order to simplify mechanization of the method, the frusto-conical back wall 21 may be spring-loaded in the direction of the opening 29. Because the shims 15 are always rolled on the loader 26 with the elastomer layer 12 on the outside, when the loader is inserted into the holder 20, the elastomer layer 12 of the shim 15 on the loader will be brought into contact with the non-elastomer layer 11 of the shim 30 previously inserted in the holder. The axial pressure, whether applied by the loader 26 or by the back wall 21 of the holder 20, will produce an intimate contact between the elastomer layer 12 of the shim 15 and the metallic layer 11 of a shim 30, previously received in the holder which contact is sufficient to insure that when the attractive force is removed from the loader 26 and the loader 26 removed from the holder 20, the shim 15 will remain in the holder 20.

After a sufficient number of loading cycles have been performed and the number of shims 15 in the holder 20 has reached the desired amount, the process is stopped. Thereafter, the stacked shims 30 are removed from the holder 20 and are bonded together to produce the conical bearing 10. The bonding may be done by any bonding process such as heat curing or the like. It is to be understood that if desired, the bonding of the shims 30 into the conical bearing 10 may also be done with the shims 30 retained in the holder 20.

In order to insure that the split 13 created at the mating point between the ends 18 and 19 of each shim 15 do not adversely affect the performance of the bearing 10, the loader 26 is rotated a random amount when in position B prior to insertion of the shim 15 into the holder 20. Therefore, the split 13 in each combination, elastomeric and non-elastomeric, layer of the bearing 10 will be offset from the split 13 in adjacent combination layers.

It will, therefore, be understood from the above description that my inventions provides for a method of manufacturing conical laminated bearings which is readily adaptable to mechanization and which has the steps of coating a face of a strip of non-elastomeric material with elastomeric material, blanking curved shims from the coated strip, rolling the shims onto the outside surface of a frusto-conically shaped loader, one at a time, inserting the loader with the shim therearound into a housing adapted to receive the rolled shim, removing the loader from the housing after depositing the rolled shim therein, repeating the loading process until a desired number of shims are received in the housing and thereafter bonding the stacked shims into a frusto-conical bearing.

I claim as my invention:

1. The method of manufacturing hollow conical laminated bearings which comprises: coating one face of a thin non-elastomeric strip of bearing material with elastomer, blanking curved shims from said coated strip, rolling said curved shims onto the outside surface of a frusto-conically shaped mandrel, applying an attractive force to the outside surface of said loading means to retain said shim on said outside surface, inserting said loading means with said shim rolled thereon into a holding means adapted to receive said rolled shim therein, removing said attractive force from said outside surface of the loading means, depositing said rolled shim in said holding means, removing said loading means from said holding means, repeating the process until a desired number of shims have been deposited in stacked relation in said holding means, and bonding the resultant stack of shims together to provide a laminated conical bearing.

2. The method of producing hollow tapered laminating bearings consisting of alternate layers of non-elastomeric bearing material and elastomeric bearing material which comprises: coating a surface of a planar sheet of bearing material with elastomer material, blanking curved shims from said coated sheet, forming said shims into hollow tapered form on an outside surface of a tapered loading means, temporarily attracting and retaining said formed shims on said loading means by an attractive force applied to said loading means, depositing said formed shims into a holding means adapted to receive said shims in their hollow tapered form, repeating the process until a desired number of said formed shims have been deposited in stacked relation in said holding means, and bonding the resultant stack into a hollow tapered laminated bearing.

3. The method of claim 2 wherein the stack of formed shims is removed from the holding means prior to bonding.

4. The method of claim 2 wherein the said loading means is a tapered electro-magnetic mandrel and the attractive force is applied to said loading means by energizing said electro-magnet.

5. The method of claim 2 wherein the outside surface of said loading means is porous and is operatively connected to a vacuum source and the said attractive force applied to said loading means is vacuum suction.

References Cited

UNITED STATES PATENTS

| | | | |
|---|---|---|---|
| 1,409,148 | 3/1922 | Apple | 156—184 X |
| 2,448,114 | 8/1948 | Olson et al. | 156—189 |
| 2,900,182 | 8/1959 | Hinks | 267—57.1 |
| 3,071,422 | 1/1963 | Hinks | 267—57.1 X |
| 3,184,357 | 5/1965 | Kaspar | 156—287 X |

CARL D. QUARFORTH, Primary Examiner

G. G. SOLYST, Assistant Examiner

U.S. Cl. X.R.

156—191, 287; 308—70, 237, 238